(12) United States Patent
Crawford et al.

(10) Patent No.: US 10,500,759 B2
(45) Date of Patent: Dec. 10, 2019

(54) METHODS FOR MANUFACTURE OF EXTRUDED OBJECTS

(71) Applicants: Robin Crawford, Carlisle (CA); John Douglas, Brantford (CA)

(72) Inventors: Robin Crawford, Carlisle (CA); John Douglas, Brantford (CA)

( * ) Notice: Subject to any disclaimer, the term of this patent is extended or adjusted under 35 U.S.C. 154(b) by 0 days.

(21) Appl. No.: 15/988,960

(22) Filed: May 24, 2018

(65) Prior Publication Data

US 2018/0264681 A1 Sep. 20, 2018

Related U.S. Application Data

(62) Division of application No. 14/767,151, filed as application No. PCT/CA2015/000173 on Mar. 19, 2015, now Pat. No. 10,011,042.

(51) Int. Cl.
| | |
|---|---|
| *B28B 3/26* | (2006.01) |
| *B01J 19/30* | (2006.01) |
| *B29D 22/00* | (2006.01) |
| *B30B 11/00* | (2006.01) |
| *B30B 11/22* | (2006.01) |

(Continued)

(52) U.S. Cl.
CPC .............. *B28B 3/2681* (2013.01); *B01J 19/30* (2013.01); *B28B 3/26* (2013.01); *B28B 17/0063* (2013.01); *B29C 48/0013* (2019.02); *B29C 48/131* (2019.02); *B29C 48/30* (2019.02); *B29C 48/302* (2019.02); *B29C 48/345* (2019.02); *B29C 48/92* (2019.02); *B29D 22/00* (2013.01); *B30B 11/005* (2013.01); *B30B 11/221* (2013.01); *B30B 15/26* (2013.01); *B01J 2219/30207* (2013.01);
*B01J 2219/30211* (2013.01); *B01J 2219/30223* (2013.01); *B01J 2219/30238* (2013.01); *B01J 2219/30253* (2013.01); *B01J 2219/30416* (2013.01); *B01J 2219/30475* (2013.01);
(Continued)

(58) Field of Classification Search
CPC .............. B01J 19/30; B01J 2219/30207; B01J 2219/30211; B01J 2219/30223; B01J 2219/30238; B01J 2219/30253; B01J 2219/30416; B01J 2219/30475; B01J 2219/3188; B28B 3/2681; B28B 3/26; B28B 17/0062; B29C 48/30; B29C 48/92; B29C 48/131; B29C 48/0013; B29C 48/302; B29C 48/345; B29C 2949/78571; B29D 22/00; B30B 11/005; B30B 11/221; B30B 15/26
USPC ..... 261/DIG. 72; 264/176.1, 177.16, 177.17, 264/209.2
See application file for complete search history.

(56) References Cited

U.S. PATENT DOCUMENTS

| | | | | |
|---|---|---|---|---|
| 1,307,635 | A | * | 6/1919 | Nielsen ..................... B01J 19/30 138/37 |
| 4,554,114 | A | * | 11/1985 | Glen ......................... B01J 19/30 261/95 |

(Continued)

*Primary Examiner* — Charles S Bushey
(74) *Attorney, Agent, or Firm* — Stuart Wilkinson (57) ABSTRACT

In a method of manufacturing objects, extrudable ceramic forming material is extruded through multiple dies arrayed around an extrusion axis, the dies mounted to permit controlled movement of the dies during the course of extrusion to vary the position of several extrudate streams exiting the dies. Extruded objects are defined by spokes corresponding to the extrudate streams with the streams having a varying spacing from a central axis.

19 Claims, 8 Drawing Sheets

(51) Int. Cl.
  *B30B 15/26* (2006.01)
  *B28B 17/00* (2006.01)
  *B29C 48/30* (2019.01)
  *B29C 48/92* (2019.01)
  *B29C 48/03* (2019.01)
  *B29C 48/00* (2019.01)
  *B29C 48/345* (2019.01)

(52) U.S. Cl.
  CPC .......... *B01J 2219/3188* (2013.01); *B29C 2949/78571* (2013.01)

(56) References Cited

U.S. PATENT DOCUMENTS

| | | | | |
|---|---|---|---|---|
| 4,575,435 | A * | 3/1986 | Kuhl | B01J 19/30 261/94 |
| 4,581,299 | A * | 4/1986 | Jager | B01J 19/30 261/DIG. 72 |
| 5,304,423 | A * | 4/1994 | Niknafs | B01J 19/30 210/150 |
| 5,779,886 | A * | 7/1998 | Couture | B01F 3/04765 210/150 |
| 5,783,069 | A * | 7/1998 | Frank | B01J 19/30 210/150 |
| 6,889,963 | B2 * | 5/2005 | Niknafs | B01D 53/02 261/94 |
| 7,246,795 | B2 * | 7/2007 | Niknafs | B01J 19/30 261/94 |
| 7,490,816 | B2 * | 2/2009 | Kavolik, Jr. | B01J 19/30 261/94 |
| 10,011,042 | B2 * | 7/2018 | Crawford | B29C 48/30 |

* cited by examiner

METHODS FOR MANUFACTURE OF EXTRUDED OBJECTS

CROSS REFERENCE TO RELATED PATENTS

The present application claims priority under 35 USC 119(e) to the provisionally filed application entitled "Hollow heat and mass transfer media and manufacturing process", having Ser. No. 61955971, filed on Mar. 20, 2014, the contents of which application is incorporated herein by reference thereto. The present application is a divisional of U.S. patent application Ser. No. 14/767,151 filed Mar. 19, 2015, now U.S. Pat. No. 10,011,042 entitled "Extruded objects and methods for their manufacture", the contents of which application is incorporated herein by reference thereto.

FIELD OF THE INVENTION

This invention relates to methods of extruding objects such as heat and mass transfer objects for use as packing media with particular application to media objects made of extruded ceramic material.

DESCRIPTION OF RELATED ART

Conventional heat and mass transfer media consist mainly of specially shaped metal, plastic or ceramic objects. Ceramic objects tend to have relatively simple shapes owing to forming limitations of foundational clay material. Exemplary ceramic shapes include honeycomb discs, dog bones and saddles. More complex and intricate shapes can be made using metal or plastic materials. Exemplary metal and plastic shapes include pall rings, which are hollow cylinders with radial perforations and mixing fingers, and buckyballs, which are generally spherical and modeled off the fullerene molecule structure with hollow or folded sections.

Packing media are typically used in tower packing and may be either deliberately placed in strategic locations to provide structured tower packing or randomly dumped into the tower vessel, in which case the media falls to rest in a random orientation. Structured media are fixed in place by adhesion or interlocking. The upfront capital cost is high due to both the quality/precision of the media and the labor to install them. The benefit of structured media is improved tower efficiency and reduced operating cost. Random packed media on the other hand have a lower upfront cost, but generally lower efficiency.

In using either type of media packing, the aim is to optimize two counteracting objectives: minimizing the pressure drop of fluid pumped through the tower and maximizing the surface area of media encountered by the fluid, where heat exchange or similar processes take place. Pressure drop is a measure of how easily the fluid flows through the media bed and is heavily influenced by the void fraction of the bed; i.e. the volume of air space not occupied by the media material itself as a fraction of the total vessel volume. Typically, the higher the void fraction, the less resistance there is to fluid flow and the lower the pressure drop. Lower pressure drop requires less energy to push the fluid through the bed. Energy reduction translates to reduced size and cost of the infrastructure equipment and reduced cost of power consumed.

Maximizing the effective surface area of the packing media helps to promote tower reaction efficiency—either heat or mass transfer reactions. Increased surface area leads to increased probability of reaction and therefore improved reaction efficiency. Both pressure drop and surface area are therefore important considerations in media design.

SUMMARY OF THE INVENTION

According to one aspect of the invention, there is provided a method of manufacturing objects comprising extruding extrudable material through a plurality of dies, the dies arrayed around an extrusion axis, the dies mounted to permit controlled movement of the dies during the course of extruding the extrudable material to vary the position of extrudate streams exiting the dies relative to the axis. Preferably, the dies are mounted for angular oscillation for manipulating the angle of extrudate streams exiting the dies relative to the axis. The dies can be mounted for angular oscillation in multiple planes angularly disposed to one another.

Preferably, the method further comprises extruding the extrudable material to obtain objects of cage form defined by a plurality of spokes corresponding to the respective extrudate streams, the spokes fused together at first and second hub regions, the spokes extending between the hub regions and bounding a hollow interior. The method can further comprise temporarily supporting the extrudate with a support housing as it emerges from the dies. The method can further comprise relatively moving the support housing and an extrusion head at which the dies are mounted to alter the cage form while the extrudate from the dies is still malleable. The method can further comprise varying the rate of extrusion through the dies in concert with controlling the movement of the dies. The extruded material is preferably a ceramic foundational material.

BRIEF DESCRIPTION OF THE DRAWINGS

For simplicity and clarity of illustration, elements illustrated in the following figures are not drawn to a common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

FIG. 12A is a top view of the pair of extruded ceramic objects of FIG. 12A.

DETAILED DESCRIPTION OF THE INVENTION INCLUDING THE PRESENTLY PREFERRED EMBODIMENTS

In heating, cooling and/or mass transfer plants, a fluid is pumped through a packing media made up of a mass of ceramic objects to cause heat exchange between the pumped fluid and the ceramic objects and/or to accelerate a chemical reaction at the surfaces of the ceramic objects. To prepare a heat and/or mass transfer plant, a large number of appropriately shaped and sized ceramic objects may be poured into a heat exchange or reaction vessel such as a tower so that the objects form a randomly packed bed.

In one application, the packing media are preheated and a large throughput of gas is passed through the media to heat it and so prepare the gas for burning. Part of the heat subsequently generated by burning the gas is subsequently used to pre-heat the media which will have cooled on giving up heat to the gas as the gas passes through the heated media. The packing media may have a variety of applications. In regenerative thermal oxidizers (RTO), hot ceramic media in a first chamber are used to preheat gas to prepare it for subsequent combustion. Exhaust gases produced by the combustion are then pumped through cold ceramic media in a second chamber of the RTO to absorb the heat from the treated gas before it exits at a chimney. In a typical operation, media packed in one tower are heated while media packed in a second tower give up heat, with the operations of the two towers being periodically switched. Packing media can also be used for cooling fluids by subjecting the media to a cooling cycle and then pumping gas to be cooled through the packed media. In these exemplary processes, the packing media application is the exchange of heat, either for heating or cooling gas that is passed through the media.

Other processes involving associated catalytic reactions may advantageously use the packing media of the invention. For example, the packing media may be used with regenerative catalytic oxidizer (RCO) processes where, typically, a precious metal coating is used either to accelerate a reaction or to lower reaction temperature. A RCO process can be viewed as an RTO process using a catalytic coating, the packing media therefore having both catalytic and thermal operating properties. In the wet sulfuric acid (WSA) process, which is a particular example of an RCO process, condensation is used to separate pollutants from a gas. Here, the ceramic packing media is maintained at a cooler temperature than that of the process gases entering the system. The temperature of the incoming gas is lowered by the packing media to its dew point whereupon the sulfuric acid pollutantcondenses out of the gas. Treated gas exits a reactor chimney and the pollutants are recovered from the bottom of the reactor.

Figure 1:
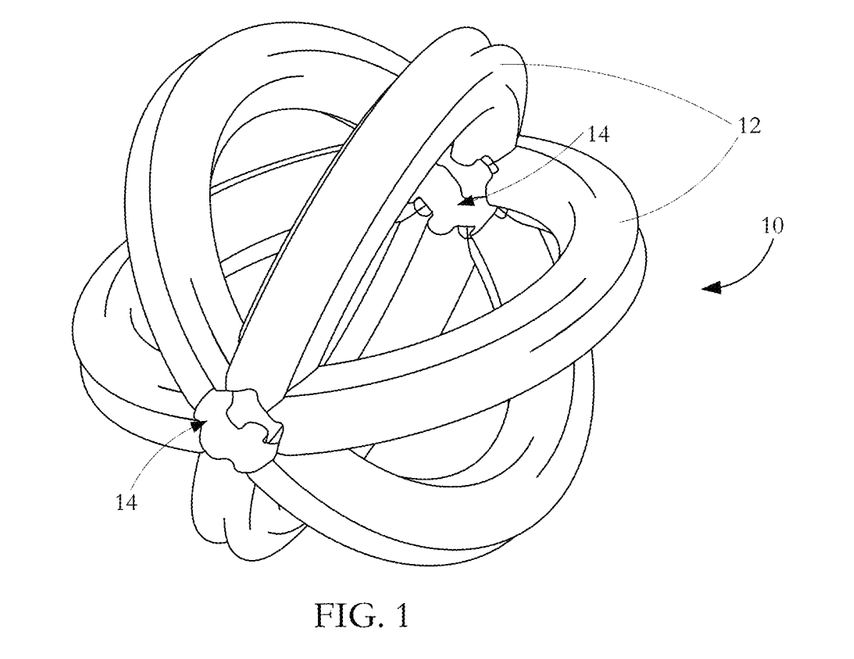
FIG. 1 is an isometric view of an extruded ceramic object according to an embodiment of the invention, the object for use in a mass of similar objects for a heat and/or mass transfer application.

Referring in detail to FIG. 1, there is shown a generally hollow ceramic object 10 which is shaped and configured for use in heat and/or mass transfer packing media. The spoked hollow ceramic heat and mass transfer object of FIG. 1 can be made of any extrudable ceramic material with different ceramic materials being used for different applications. For example, heat transfer applications will normally use a dense, high temperature ceramic formulation offering a high thermal mass. On the other hand, stable, chemically resistant formulations may advantageously be used for mass transfer applications to remove the risk of corrosion and erosion. Filtration applications may use porous, light weight formulations for mechanical filtration and entrapment by making use of the high surface area and structured pore distribution to filter microscopic particles from a fluid and retaining or entrapping them at the surface of the media until subsequent cleaning or until the media has reached its useful life and is replaced.

The packing object of FIG. 1 has a generally spherical cage bounding a substantially hollow interior. The surface cage is defined by six curved spokes 12 which extend, like lines of latitude between "polar" hub regions 14. As shown more clearly in one of the examples depicted in FIG. 4, the curved spokes 12 have a cross-sectional area which is generally in the shape of a five lobed star, the points of the star extending from a core region of the spoke.

Presuming a nominal spherical surface of the FIG. 1 object is defined by the radially outermost extent of the spokes 12, an object of the form illustrated is ideally made with the volume of ceramic material occupied by the spokes being less than 30% of the interior volume of the nominal sphere and the total surface area of ceramic material being at least 30% greater than the area of the nominal sphere. For a heat exchange application, packing objects of the form shown in FIG. 1 can be made with a void fraction of at least 70%. Void fraction is dependent on object size and so the object size is selected from a range offering a good compromise between achieving low pressure drop and high surface area in the exchange vessel. In an exemplary embodiment of FIG. 1, the diameter of the nominal sphere is 4.5 inches, each spokes has a cross-sectional area of the order of 0.43 square inches, and the total surface area of the ceramic material is of the order of 96.5 square inches.

In setting up a heat/mass transfer plant, packing objects of the form shown in FIG. 1 are randomly poured into the heat exchange or reaction vessel, this method offering the advantage of relatively easy and low cost installation compared with assembling structured packing media.

Figure 2:
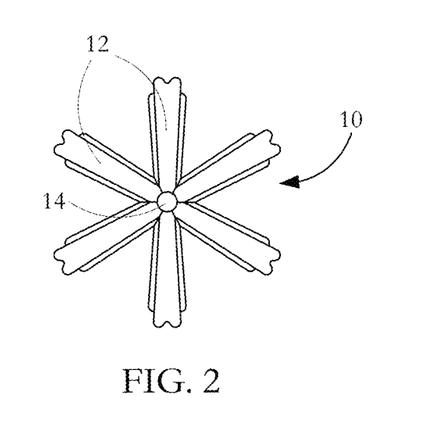
FIG. 2 is a top view of a top view of an extruded ceramic object according to another embodiment of the invention.
Figure 3:
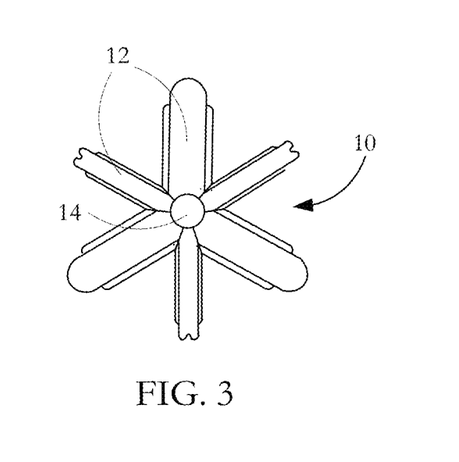
FIG. 3 is a top view of an extruded ceramic object according to a further embodiment of the invention.

In the embodiment of FIG. 1, the spokes are of uniform cross-sectional shape and area except where they fuse together at the hub regions 14. In an alternative embodiment as shown in FIG. 2, the cross-sectional area of a spoke 12 varies along its length, the area being relatively smaller adjacent the fused hub regions 14 compared to the area at a point of the spoke more distant from the hub regions. This configuration, in use, may provide improved fluid flow through an exchange vessel packed with the media compared with media having spokes having uniform cross-sectional area throughout their length. In another alternative as shown in FIG. 3, certain spokes are different from other spokes in their cross-sectional area and/or shape.

Depending on the relationship between the desired surface area of the ceramic and desired amount of ceramic material to be used in manufacturing the media objects, specific spoke cross-sectional profiles can be chosen, such profiles including but are not limited to round, square, triangle, oval, and n-pointed star, where n may take any of a range of integer values. Such spoke cross-sectional shapes are illustrated along the x-axis in the graph of FIG. 4 which also shows the variation with spoke cross-sectional shape of (a) the ceramic material volume and (b) ceramic material surface area for a unit length of spoke having a cross-sectional shape and size which can be accommodated within a square of unit size. For the comparison, a 5 inch diameter sphere with maximum single spoke diameter of 0.9 inches (or cross-section of 0.64 square inches) was assumed. The graph has a first plot (triangles) showing ceramic surface area exposed for a 6-spoked hollow sphere medium of the form illustrated in FIG. 1 and for spokes of a range of cross-sectional shapes. A second plot (diamonds) shows mass of ceramic consumed for the same 6-spoked hollow sphere medium for the same range of spoke cross-sectional shapes. It can be seen that modifying the spoke cross-sectional profile can have a significant influence on both the effective surface area and the mass of ceramic material consumed to achieve a specific surface area. For example, as illustrated, a 3-point star presents a slightly larger surface area than an oval cross-sectional shape, but the mass volume is much lower.

Figure 5:
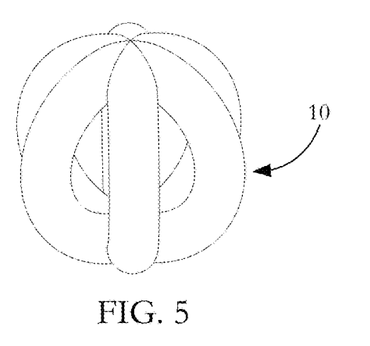
FIG. 5 is an isometric view of an extruded ceramic object according to an embodiment of the invention.
Figure 6:
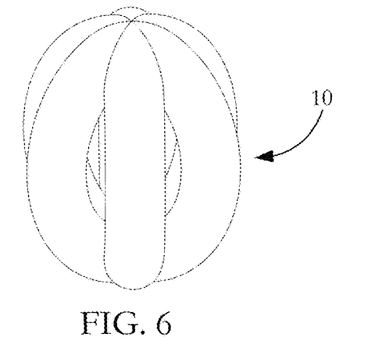
FIG. 6 is an isometric view of an extruded ceramic object according to a further embodiment of the invention.
Figure 7:
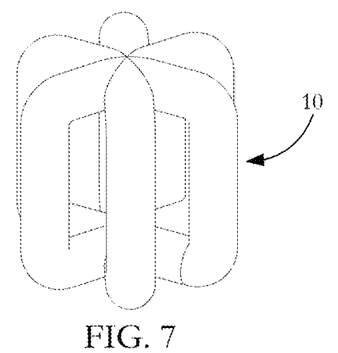
FIG. 7 is an isometric view of an extruded ceramic object according to yet another embodiment of the invention.
Figure 8:
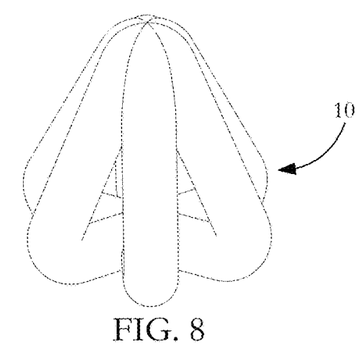
FIG. 8 is an isometric view of an extruded ceramic object according to yet another embodiment of the invention.
Figure 9:
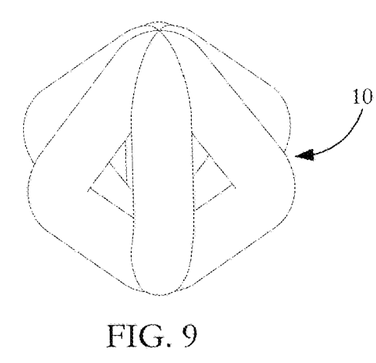
FIG. 9 is an isometric view of an extruded ceramic object according to a still further embodiment of the invention.
Figure 10:
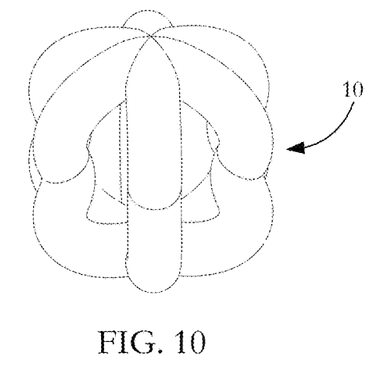
FIG. 10 is an isometric view of an extruded ceramic object according to another embodiment of the invention.

The particular shape and orientation of the spokes may also be selected to influence the resistance to fluid flow through the packed media. For example, the spokes or spoke elements may lie along, and define, a shape that is, for example, nominally spherical (FIG. 5), ellipsoidal (FIG. 6), hexagonal prism (FIG. 7), hexagonal pyramid (FIG. 8), hexagonal bipyramid (FIG. 9) and hexagonal hourglass (FIG. 10). In addition, as will be evident from the following description of an exemplary manufacturing apparatus and method, an extruded ceramic object can be formed with a number of spokes that is greater or fewer than the illustrated six spokes of each of the illustrated embodiments.

For the FIG. 1 object shape, as the radius of the spherical cage increases, the void fraction per single object increases but the overall void fraction in an exchange vessel in which the objects are packed may be reduced owing to an increased probability of nesting. Nesting is the settling of media objects in which a piece of one object becomes mechanically locked into an opening or aperture of an adjacent object when the objects are randomly packed together.

Figure 11A:
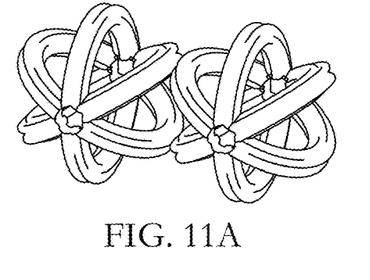
FIG. 11A is an isometric view of a pair of extruded ceramic objects of the form shown in FIG. 1, the objects shown in one juxtaposition.
Figure 11B:
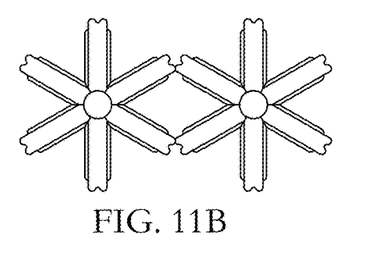
FIG. 11B is a top view of the pair of extruded ceramic objects of FIG. 11A.
Figure 12A:
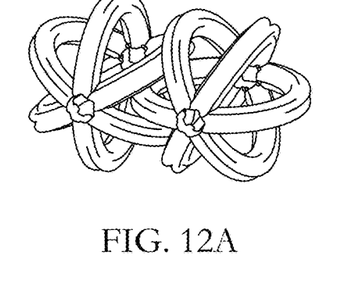
FIG. 12A is an isometric view of the pair of extruded ceramic objects of FIG. 11A, the objects shown in another juxtaposition.
Figure 12B:
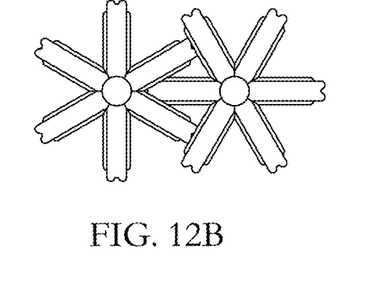
Figure 13A:
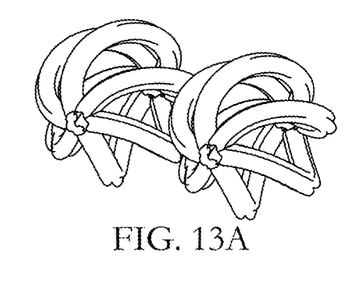
FIG. 13A is an isometric view of a pair of extruded ceramic objects according to another embodiment of the invention, the objects shown in one juxtaposition.
Figure 13B:
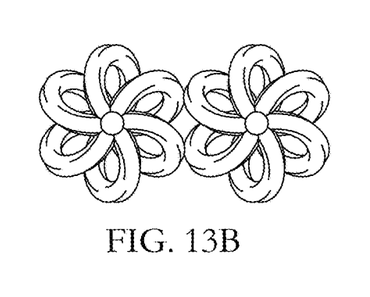
FIG. 13B is a top view of the pair of extruded ceramic objects of FIG. 13A.
Figure 14A:
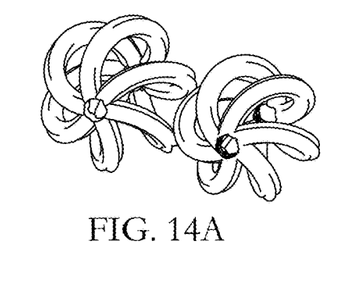
FIG. 14A is an isometric view of the pair of extruded ceramic objects of FIG. 13A, the objects shown in another juxtaposition.
Figure 14B:
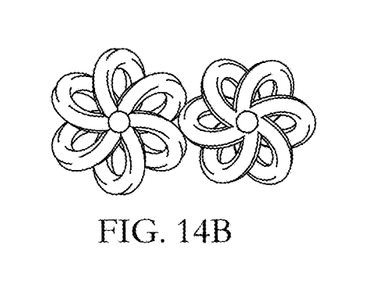
FIG. 14B is a top view of the pair of extruded ceramic objects of FIG. 14A.

For example, adjacent objects of the form shown in FIG. 1 may have a relative orientation as shown in FIG. 11A (isometric view) and FIG. 11B (top view) in a maximum attainable void fraction. Here, the outer extremities of the spokes are touching one another and so keep the objects apart. However, spokes contained within planes containing the axis of the sphere may be prone to a nesting configuration in which a spoke of one object nests between two spokes of an adjacent object as shown in FIGS. 12A and 12B. The FIG. 11 and FIG. 12 packing configurations are extreme cases. In practice, a range of nesting configurations are likely to occur when objects of this form are randomly packed but the overall nesting might account for a reduction in void fraction of the order of 10%.

A modification of the FIG. 1 packing object is shown in FIGS. 13A to 14B. The shape of the object and the configuration of the spokes defining the spherical surface envelope are designed to reduce the amount of nesting that can occur compared with the shape and configuration of the packing object of FIG. 1. In the FIG. 13A to 14B configuration, the spokes of the nominally spherical packing object have a rotational offset or twist about the central axis of the sphere. FIGS. 13A to 14B are views corresponding to FIGS. 11A to 12B showing for the twisted spoke object the minimum and maximum nesting that can result as between two adjacent objects when they are part of a randomly packed bed. It can be seen from FIGS. 14A and 14B that the extent of nesting is considerably reduced compared with the FIG. 1 object. The twist causes a slight reduction in void fraction for a particular object compared with an identically sized object of the form shown in FIG. 1 but the twist considerably reduces the amount of nesting because the resulting curve in a spoke of one object prevents it from nesting between curved spokes of an adjacent object. Consequently, the overall void fraction in a randomly packed bed of the objects is increased. A suitable twist angle is of the order of 30 degrees which means that the plane of a particular spoke where it fuses at one hub region is 30 degrees offset compares with the plane of that spoke where it fuses at the other hub region. In addition to spherical packing media, the spoke twist can be configured in packing media having alternative surface envelopes such ellipsoid and polyhedral. The twist extending along the length of the packing object corresponds to each of the spokes lying in a curved surface which also contains the axis of the object. As will be described presently, the spokes can be alternatively configured to lie in alternative curved surfaces containing the axis, with the resulting spokes generally offering some advantage in limiting nesting.

Figure 15:
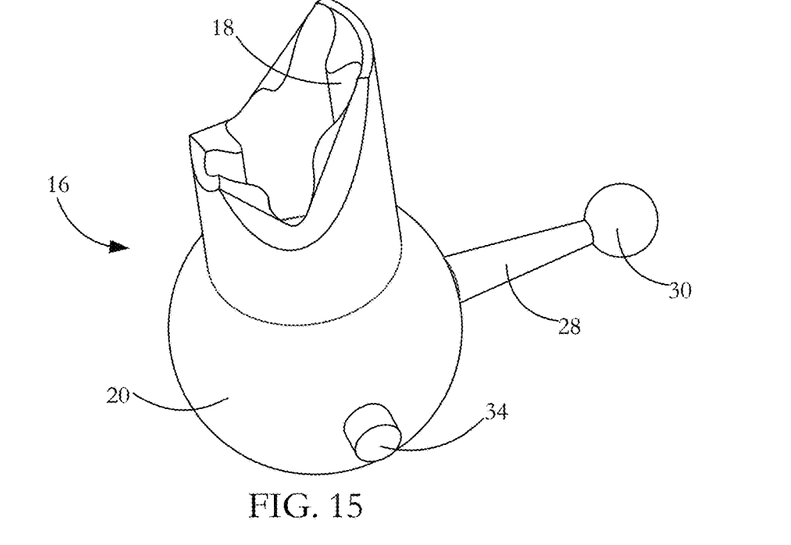
FIG. 15 is an isometric view of a die arrangement for use in extruding ceramic objects according to embodiments of the invention.
Figure 16:
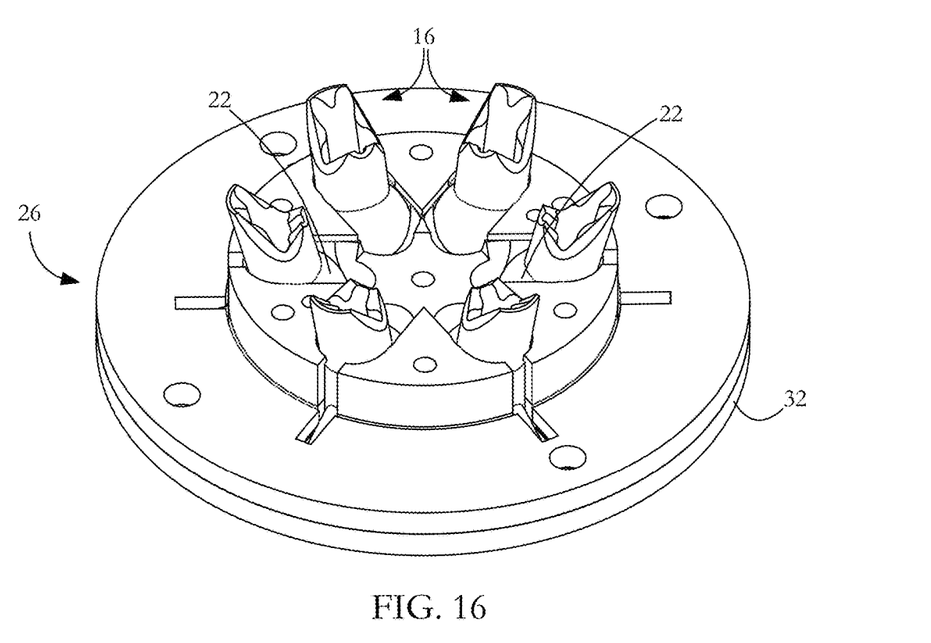
FIG. 16 is an isometric view of a multiple die arrangement using dies of the form illustrated in FIG. 15.

A process for manufacturing the spoked ceramic object of FIG. 1 is now described with reference to FIGS. 15 and 16. Referring in detail to FIG. 15, there is shown an extrusion die for use in producing a continuous extrudate. A die tip 18 is mounted to a ball 20 which, as shown in FIG. 16, sits in a socket 22 in a base plate 24 forming part of an extrusion head 26. The die 16 has an actuation arm 28 having a ball 30 for engagement in a socket (not shown) on the underside of a sleeve 32. The die 16 is one of six identical dies mounted symmetrically around the extrusion head 26 so that they can each angularly oscillate about an axis defined by bosses 34 on respective sides of each die. Each die is permitted to oscillate in a respective plane containing the central axis 36 of the extrusion apparatus. The sleeve 32 is moved up and down to drive the actuation arms 28 so as synchronously to oscillate each die 16 about an axis defined by the aligned bosses 34. By angularly oscillating each die barrel, the associated die nozzles 18 are moved in a corresponding oscillation towards and away from the central axis 36. As shown, the die nozzles are configured to produce an extrudate stream having a cross-sectional area in the form of a 5-point star as shown in FIGS. 15 and 16. Die tips or nozzles having alternative aperture shapes such as any of those shown in FIG. 4 can be substituted for the illustrated nozzle.

To produce the shape of the FIG. 1 extruded ceramic object, the angular oscillation of each die 16 is coordinated with the angular oscillation of each of the other dies and is also coordinated with the linear rate of extrusion through the die nozzles 18. The dies 16 are oscillated symmetrically so that the die nozzles 18 at one point of time are all equally close to the central axis at positions sufficiently close to each other that the extrudate exiting from the six die apertures fuses together to form a hub region 14. At a subsequent time in the oscillation cycle, the die nozzles are equally spaced from the central axis 36 so that symmetrically arranged curved extrudate spokes 12 are produced extending between successive hub regions 14.

Individual motion control of the barrel of each die 16 permits synchronized motion control of the die aperture positions according to an applied motion program. Control of the die assembly is linked to an extruder feed rate controller. By appropriate interdependent control of the dies 16 and the extrusion feed rate, objects having any of a variety of cage surface envelope shapes, including those illustrated in FIGS. 5 through 10, can be made using the six component die assembly illustrated in FIG. 16. These illustrated object shapes have a start and finish point in the extrusion process, these being in each case a fusion of the extrudate elements to form hub regions 14. However, the extrusion processes for the respective shapes differ according to the applied motion control program imposed in order to obtain the intermediate spoke profiles. For example, a sinusoidal motion control sequence is applied to obtain the sphere of FIG. 5, whereas a sequence of (a) rapid die outward movement, (b) pause, (c) rapid die inward movement, is applied to obtain the hexagonal prism of FIG. 7.

As indicated, the surface envelope of a spoked hollow media object can be any of several forms, examples of which are as shown in FIGS. 5 through 10, but optionally with 3, 4, 5, 7 or more spokes (or sides) instead of the six spokes illustrated. Exchangeable die support plates 24 forming part of the extrusion head can have differing numbers of bays for mounting a desired number of die components corresponding to the desired number of sides/spokes in the extruded ceramic object.

Figure 4:
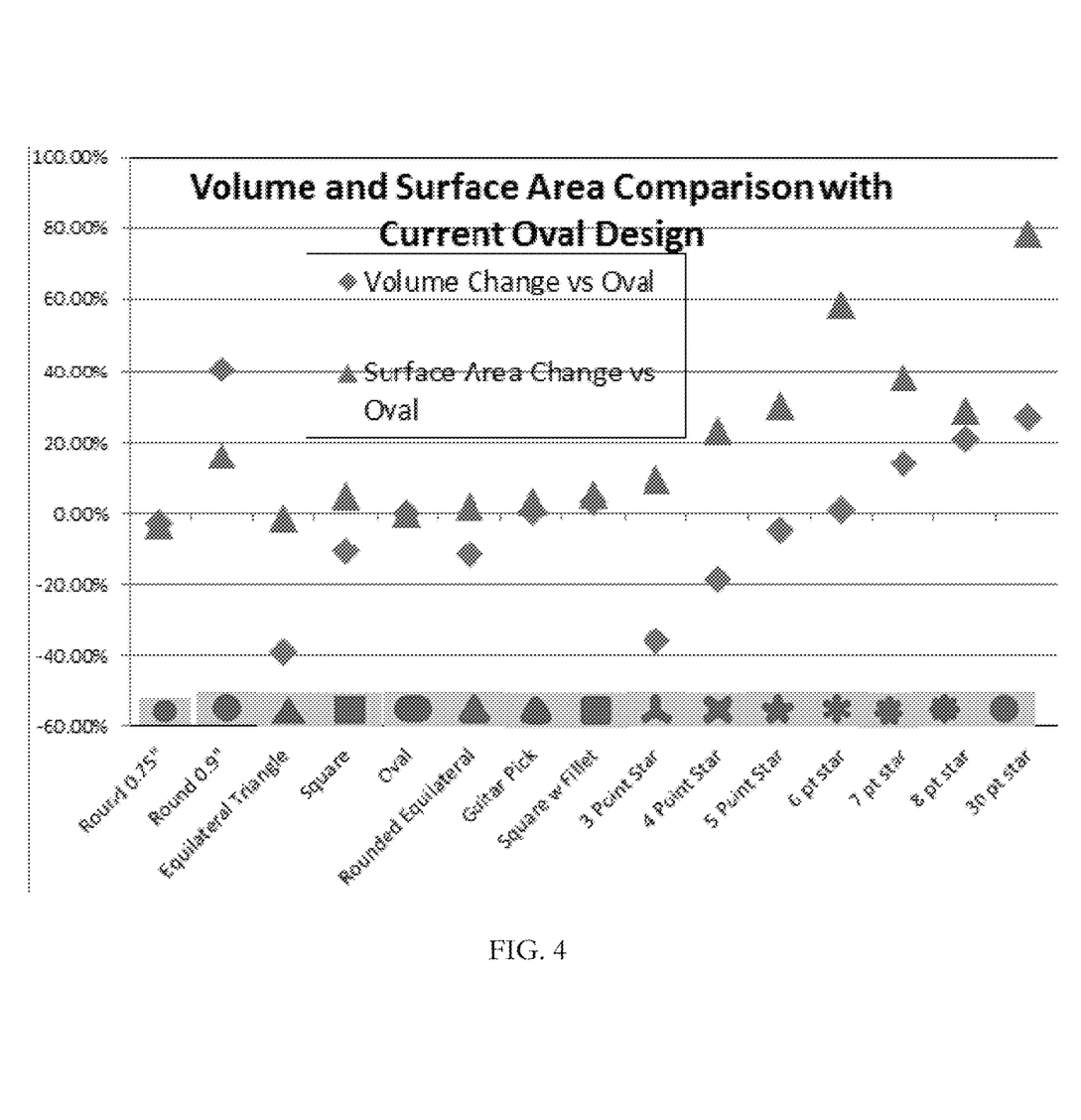
FIG. 4 is a graphical illustration showing a relationship between spoke area cross-sectional shape, spoke volume, and spoke surface area.

The dies illustrated in FIGS. 15 and 16 have a nozzle 18 shaped such that the exiting extrudate has the cross-sectional form of a five-lobed star. The spokes can have any of a number of other cross-sectional profiles, examples of which are illustrated in the graph of FIG. 4. The spoke cross-sectional shape selected can materially influence the exposed surface area of ceramic material for a particular object shape and configuration. The selected shape can also materially influence the volume of material consumed to achieve a specific surface area. Interchangeable die nozzles or tips 18 are mountable in the die barrels, the die tips defining the die exit aperture size and shape. Depending on the particular die aperture shape, profiling of the spokes is present on all sides of the spokes except where the spokes are fused together at the hub regions.

As previously indicated, the overall size of an extruded ceramic object influences the attainable void fraction for a collected mass of the objects and therefore affects the pressure drop when fluid is driven through a bed packed with the objects. The overall size also affects the number of packing objects per unit volume. In the apparatus illustrated in FIG. 16, the size of packing objects being made is increased or decreased by (a) changing the rate of extrusion of the extrudable green ceramic material relative to a particular die motion sequence, (b) changing the die motion sequence relative to a particular rate of extrusion, or (c) changing both. For instance, a larger sized packing object requires a slower die cycle for a given extruder speed (fewer cycles for a given mass throughput). Generally, changing the rate of die oscillation is easier than changing the extrusion rate as the extruder is relatively massive in size and not as responsive to inputs as the smaller, dynamic die assembly. In addition, extruders are typically set to one speed during operation and left at that speed for an entire production run.

The extrudate elements can be extruded over an inner mandrel to form a hole 40 at each of the hub regions 14. The presence of the two axial holes 40 at the hub regions 14 increases the open area and void fraction slightly for improved pressure drop when the packing objects are used in a heat or mass transfer application. The spokes 12 are bonded together at the hub regions by pressure produced when the dies are in the inner or home position at the start and finish of each cycle. A slight back pressure is applied to force the individual extrudate spokes to fuse or bond together at the hub regions. This bonding prevents the packing object from falling apart into separate spokes during subsequent process steps such as forming, drying, and firing, and later when the packing media is being used in a heat exchange or like application. Pressure alone is normally enough to bond the spokes because it forces the interfaces together, roughening the surfaces and therefore increasing the interface bond area. Pottery welding techniques can additionally be used to further improve the bond. One such technique involves the scoring and wetting of the interface between adjacent spokes. Scoring helps to produce an increased surface area for bonding at the interface. In another technique, wetting helps the water diffuse into the spoke surfaces to increase the bond strength once dried and fired.

As the extruded ceramic object is formed, there may be advantage or need to provide a temporary support to the extrudate streams as they emerge from the extrusion head. This may be used to maintain the dimensional parameters of the embryo object while the ceramic material is still slightly soft or may be used to introduce a post-extrusion modification to the ceramic material before it is dried and is fired.

Figure 17:
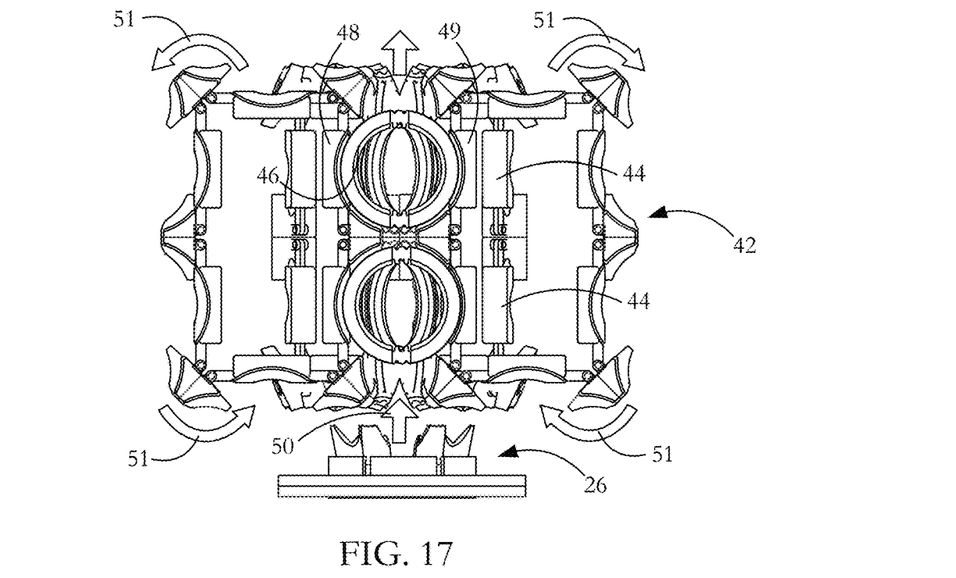
FIG. 17 is a side view of apparatus according to an embodiment of the invention for use in manufacturing extruded objects.

In one embodiment as shown in FIG. 17, a conveyor sub-system 42 is used to provide support, the sub-system having two or more stages 44, each incorporating a carrying cavity 46 bounded by a housing. The inner profile of the cavity matches the outer profile of the desired shape of the finished extruded ceramic object. Each housing has two or more parts 48, 49 which are relatively mounted so that the parts can be moved together to embrace an extruded object to support it, but can be moved apart to allow release of the extruded object. In terms of process sequence and in relation to the extrusion direction 50, parts of the housing of a trailing conveyor stage are initially separated but are brought together to embrace the extrudate streams emerging from the extrusion head 26. Shape forming or shape maintenance takes place inside the cavity 46, with the walls of the cavity offering support to the spokes which have not yet been fired and which may therefore be slightly malleable and somewhat delicate. This conveyor stage is then moved in the process direction—up as shown in FIG. 17—to a downstream position where the housing parts 48, 49 are separated. The extruded object is supported by the conveyor sub-system for whatever time is required satisfactorily to reduce the risk of any part of the extruded object collapsing or being otherwise damaged owing to it being in an unsupported state. In addition to support, the conveyor may additionally or otherwise be used to influence the state of the extruded object such as by drying it or heating it or further shaping it.

Synchronized with the trailing conveyor stage proceeding through the sequence of embracing the emerging extrudate, moving it forward in the process direction, and then opening up to release the extruded object, a leading conveyor stage which has previously supported an extruded object goes through a recovery sequence as shown by arrows 51. In this, the housing of the leading conveyor stage opens to release the previously supported object, passes around the housing parts of the trailing conveyor stage in a direction opposite to the process direction, and then takes the place recently vacated by the trailing conveyor stage to be ready to embrace extrudate newly emerging from extrusion head 26.

In one mode, conveyor motion is programmed to move in unison with motion of the dies and extruder feed so that the conveyor acts solely as a support mechanism. In an alternative mode, conveyor motion is made intermittently independent of die motion and extruder feed so as to shape the still-malleable extrudate downstream of the extrusion head. In one example of independent movement, the conveyor is moved in the extrusion direction at a speed slower than the extrusion rate so that the extruded part, as it exist the extrusion head, is forced to adopt a relatively squat form in the extrudate direction. Independent motion can also be used to cause spoke portions to adopt relatively tight curves. In a further example, the conveyor is moved in the extrusion direction at a speed faster than the speed at which extrudate exits the extrusion head so as to cause the cage shape of the extruded object to have a relatively drawn out form.

Independent motion can be used to produce effects that are not achievable with die motion alone such as introducing relatively tight corners into the spokes and in implementing shape coining. Generally, die motion is limited by the extent to which the extrudable clay material can bend without breaking. Drier clay formulations (<20% moisture) are strong but have relatively low plasticity. Consequently, the spokes cannot be bent to a tight radius without the risk of breaking. In contrast, wetter clay formulations (>20% moisture) are more flexible allowing the formation of tight corners but may leave the just finished object somewhat weak such that, before drying, it cannot support its own weight without deformation. The conveyor motion assists in molding drier, stronger, less plastic formulations to form intricate shapes that would normally only be achieved with wet materials. In one example, extrudate from a die resulted in a corner having a radius of about 1 inch. By adding an appropriately timed delay or reverse in the conveyor motion program a lower radius of curvature approaching a square corner was achieved. Independent conveyor motion can include any of conveyor movement in the same direction as extrusion at varying speeds, reverse conveyor movement at varying speeds, and delay/pause, etc.

Conveyor elements contacting the extrudate are made of non-stick material or have a non-stick material coating on their contact surfaces to minimize marring of the as-extruded surface. Cleaning brushes or air jets may be used to prevent debris from landing on the conveyor and possibly sticking to a packing object as it is about to be formed. Die release lubricants may also be applied in cases where clay to belt sticking may be particular problematic, such as when using specialty formulations that include particularly hydrophobic materials that tend to stick to everything but themselves. The conveyor movement shown in FIG. 17 is upward. Upward and downward conveyor movement offer some advantage over lateral movement insofar as gravitational forces are generally symmetrical as applied to the elements of the packing objects which are also generally symmetrically arranged. Conveyors moving in other directions can also be contemplated provided their effectiveness is not compromised by the weight of extruded object. Generally, gravity has less effect in those cases where the extruded clay material is stiff and strong.

In coining, the conveyor sub-system is used to produce a better and more consistent cage shape. Typically, the extrusion head alone, if used to extrude a nominally spherical cage, actually produces a sphere that is slightly elliptical or otherwise varies from a classical spherical shape. The coining action introduced at the conveyor takes the ellipsoid shape and coins (or compresses) it along its central axis to produce a spherical shape which is more nearly perfect when the object is released from the conveyor.

A modified production process and equipment are used to manufacture the nominally spherical packing object of the form illustrated in FIGS. 13A to 14B which, in contrast to the objects of FIGS. 11A to 12B has an introduced twist. The twist is the result of a skew between the start and finish hub locations 14. The skew can range from slightly more than 0 degrees to a whole turn or more (360+ degrees). The twisted shape can be made by any of a variety of methods including (a) form-then-twist, (b) twist-while-forming, and (c) extruded twist.

In the form-then-twist method, the basic shape is first formed at the extrusion head with spokes aligned as described in the method of making the object of FIG. 1. A twist is then introduced downstream of the extrusion head with a leading section of the object being rotated while a trailing section is maintained fixed in place. To effectively introduce the twist, an extrudate material is selected that is sufficiently plastic to enable it to deform but which has sufficient memory that it will remain in its new configuration after the twisting influence is removed. The twist process is introduced at a stage between a supporting conveyor stage and a drying conveyor stage.

In the twist-while-forming method, the twist is introduced while the shape is being formed at the extrusion head. This is achieved by having the forming conveyor rotate about the centre axis of the die/part. This rotation produces the skew between the start and finish locations of a given spoke. In alternative method, the extrusion head, but not the conveyor, is rotated about the feed axis, although this method is not preferred because the power to rotate the extruder is greater than that required to rotate the conveyor. Further, rotating the extrusion head is more difficult owing to the presence of wiring, hoses, sensors, and mechanical linkages mounted to the die that generally need to be free to move. Rotating the conveyor only requires one set of power and control wires to operate the assembly. However, a benefit of the twist-while-forming method is that the die motion, conveyor motion, and twist motion are all independently controlled. This permits the formation of a range of shapes including complex shapes that have no twist at all and objects that have varying degrees of twist within the object itself.

In the extruded twist method, the die tips are driven in directions that are askew from the central feed axis. The die movement is used to produce a continuous twist or helical extrusion from a start hub region to the finish hub region. While this method does not permit as complicated a shape as the twist-while-forming method, the continuous bending to produce a helical profile is much gentler on the foundation clay material, so as to produce less stress in the material and consequently a more consistent and stronger packing object. The twist while-forming-technique forces the material to bend in contrast to the extruded twist method which extrudes the material so that it has a bent profile. A sensitive or weak clay material is more susceptible to stress cracking or catastrophic failure with the twist-while-forming or form-then-twist techniques. Continuously and gently shaping the profile using the extruded twist method works well for less robust clays that may lack plasticity and/or strength.

Figure 18:
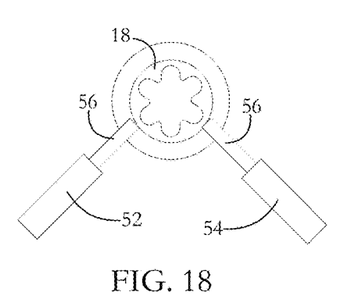
FIG. 18 is schematic view showing a dual actuator die for use in the manufacture of an extruded object according to an embodiment of the invention.
Figure 19:
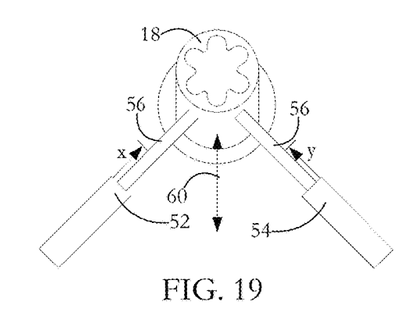
FIG. 19 is schematic view showing use of the dual actuator die of FIG. 18 in manufacturing an extruded object according to another embodiment of the invention.
Figure 20:
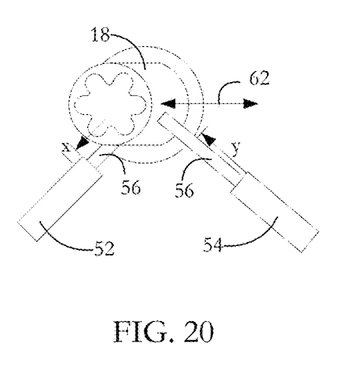
FIG. 20 is schematic view showing use of the dual actuator die of FIG. 18 in manufacturing an extruded object according to yet another embodiment of the invention.
Figure 21:
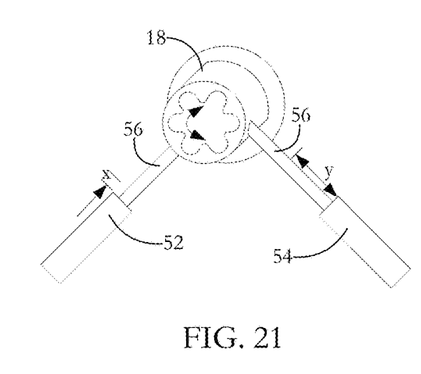
FIG. 21 is schematic view showing use of the dual actuator die of FIG. 18 in manufacturing an extruded object according to yet another embodiment of the invention.
Figure 25:
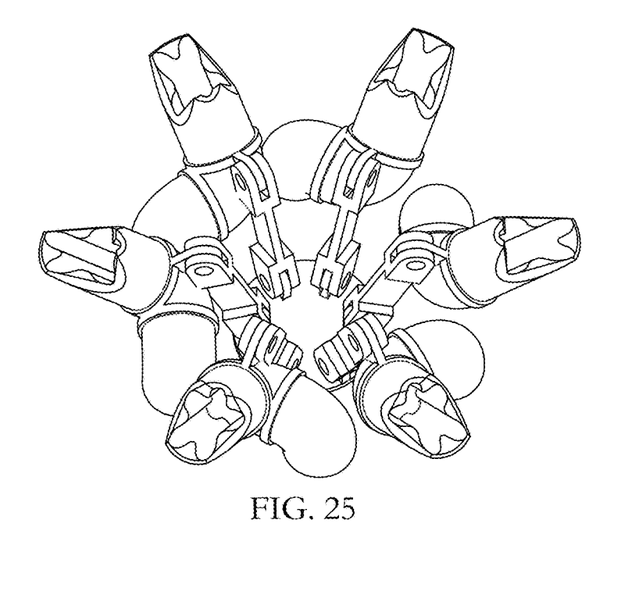
FIG. 25 is an isometric view of a multiple die extrusion head for use in extruding objects according to an embodiment of the invention.

In another embodiment of the invention, each of the die tips is driven by a pair of actuator 52, 54. As shown in the schematic views of FIGS. 18 to 21, actuator rods 56 fixed at their leading end to a die 16 are driven along x and y axes that are at right angles to one another. FIGS. 19 to 21 show different die tip motions that can be obtained with the double actuator arrangement acting on a modification of the ball and socket mounted die of FIG. 15. FIG. 18 shows the actuators 52, 54 in their "home" position and FIG. 25 shows an extrusion head 26 having six identical dies 14.

A basic sphere is obtained if, as depicted in FIG. 19, the two actuators 52, 54 have synchronized and equal movement along their x and y axes, the mounting of the dies and the resolution of the actuator movements being such as to produce linear movement of the die tip in a radial direction relative to the axis of the extrusion equipment as shown by arrow 60.

Figure 26:
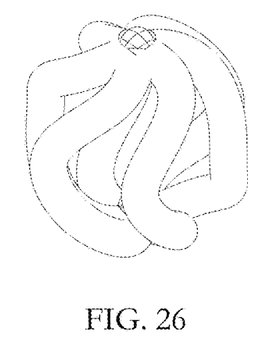
FIG. 26 is an isometric view of an extruded object according to an embodiment of the invention.
Figure 27:
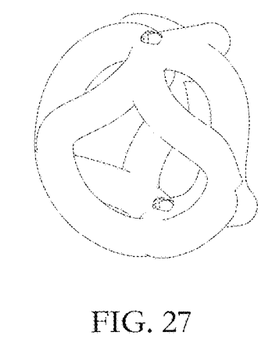
FIG. 27 is an isometric view of an extruded object according to another embodiment of the invention.

A sphere having spokes in a wave configuration is obtained by operating each dual actuator so that, as shown in FIG. 20, the actuating rods 56 of the actuator 52 is driven further along its actuation axis than the actuating rod of the actuator 54, this causing an angular oscillation in a skew direction 62 relative to the extrusion axis. Movement of the dies is synchronized and is periodically reversed to cause the spoke wave to progress in the opposite direction. A sphere of the general form illustrated in FIG. 26 is obtained. A sphere having spokes in a fishnet configuration as illustrated in FIG. 27 can be obtained by operating each dual actuator so as individually to obtain the wave formation as described with respect to FIG. 20. However, the movement of each die is synchronized with that of every next-but-one die around the extrusion head, while movement of each die is generally the reverse of its next adjacent die. Adjacent spokes are consequently made to contact and knit to each other at positions remote from the hub positions 14. Back pressure can be introduced at the hub to assist in welding adjacent spokes together by forcing separate extrudate streams to intertwine. This knitting or intertwining of the clay together produces strong bonds and, overall, a strong packing object.

With reference to FIG. 21, a spoke can be twisted about its own axis during extrusion by pulling one of the actuating rods of the dual actuator back along its drive axis past a position representing the rest or hub position. At the same time, the other actuating rod is driven forwardly along its drive axis. As previously mentioned, for achieving spokes that vary in cross-sectional area along their lengths, the green ceramic is either drawn out or compressed as it exits the dies. Drawing stretches the malleable clay resulting in a thinner cross-sectional area while compressing it increases the cross-sectional area.

With the dual actuator arrangement, a variety of other die movement combinations can be achieved resulting in object configurations other than those illustrated. While the die actuating rods are shown moving along axes that are orthogonally arranged, actuators can be mounted with actuator rods or other drive mechanisms disposed relative to each other at an angle greater or less than a right angle. While for use as a packing object in heat exchange and reaction vessels, an object which is generally symmetrical about the extrusion axis is preferred, the dual actuator dies of an extrusion head can be driven asynchronously so that a non-symmetrical cage is formed.

Figure 22:
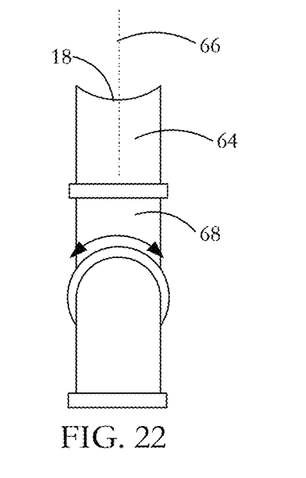
FIG. 22 is side view of an alternative form of dual actuator die arrangement for use in manufacturing an extruded object according to an embodiment of the invention.
Figure 23:
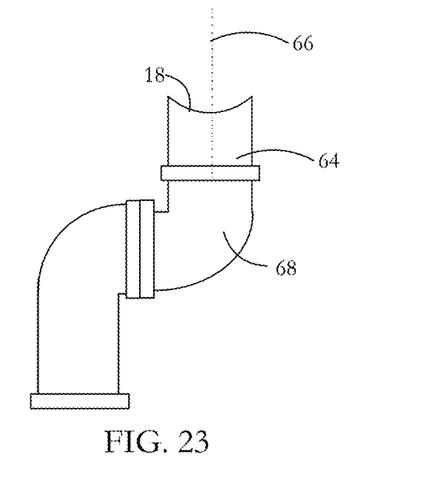
FIG. 23 is a front view of the dual actuator die arrangement of FIG. 22.
Figure 24:
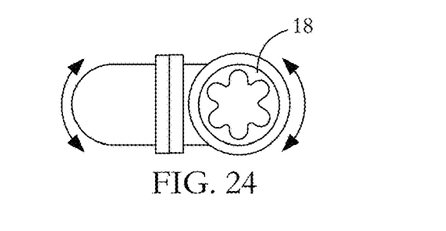
FIG. 24 is a top view of the dual actuator die arrangement of FIG. 22.

In a further embodiment, similar die movement configurations can be achieved with dies mounted differently from the dual actuator and ball and socket mounted die arrangement described with respect to FIG. 15 and FIGS. 18 to 21. As shown in FIGS. 22 to 24, a die tip 18 is mounted in an arm 64 that is rotatable about an axis 66 relative to an intermediate section 68 and is also rotatable about the central axis through the die aperture. Further, the intermediate section is mounted relative to the corresponding extrusion barrel 70 to permit driven movement about an axis 72 relative to the extrusion barrel. Extrudable clay material forced into the barrel 70 is driven along passages in the intermediate section 68 and the arm 64 into the die tip 18. As in the case of the dual actuator, a motion program mixes the three rotations to obtain a range of packing object shapes and spoke configurations.

As previously indicated, the extrudate streams, as they exit the extrusion head, form a string of interconnected packing objects supported by the conveyor. Once the leading packing object of the string is fully formed, it is cut from the string to form a standalone object. The cutting action may be effected using a fly-cutter, a cutting wire, a pinching action of elements of the conveyor, or some combination of wire and pinching, etc. The wire makes a clean cut, as it is small in cross-section and does not pick-up debris that may drag across the surface producing an undesirable finish. A pinching conveyor can further neck down the bonded start and finish segments of the object. The necking action also tends to increase the bond strength where the spokes fuse together. Combining the wire and pinching makes for a clean and strong termination point.

Following cutting, the particular stage of the support conveyor 42 containing the cut away object is opened up to release the separated packing object. Opening occurs progressively from one end to the other, so as not to stress the extruded object to its deformation point. The conveyor housing for that stage is then withdrawn back to the forming area for another cycle. The finished object is either ejected onto a continuous drying line or is picked from the conveyor and placed on the drying line by a pick-and-place robot. Both techniques are performed smoothly so as not to damage the packing objects. The formed objects are then dried by being uniformly exposed to convective air and heat at a temperature below 100 degrees C.

Figure 28:
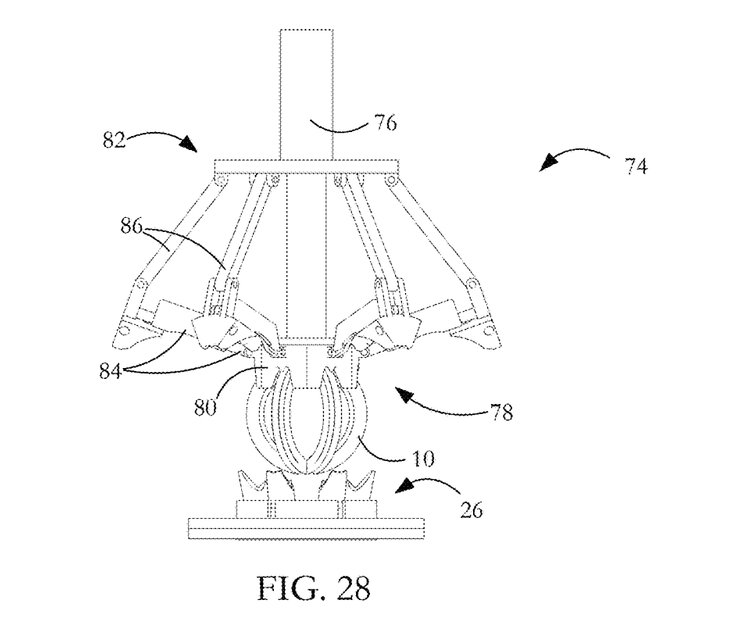
FIG. 28 is a side view of apparatus according to an embodiment of the invention for use in manufacturing extruded objects.

As an alternative to the multi-stage conveyor, an automated extraction fixture 74 as shown in FIG. 28 is used. Two of the illustrated fixtures are operated simultaneously, the fixtures mounted at the end of robotic arms 76 or an equivalent automated control system. As one fixture 74 supports and/or forms the extruded object 10 at the completion of extrusion, the other fixture drops a previously finished object onto a drying conveyor. Each fixture 74 operates by slowing retracting an inner section 78 having a top hub part 80 to grip the top of the object 10 while fixing an outer section 82 having legs 84 that converge together by means of a levered hinge mechanism 86 to grip the bottom of the object. Once the supported extruded object is fully formed, the robotic arms 76 exchange positions and the cycle repeats.

The high void fraction and surface area of extruded objects when used as packing media benefit both the heat exchange applications previously described and the method for manufacturing the packing objects. In this respect, drying times can be particularly fast owing to the high surface area presented by the packing part shape and structure, this being important for driving off moisture. The cage envelope bounding the object's hollow interior is also important for achieving relatively uniform drying. Non-uniform drying might otherwise produce stresses leading to warping, cracking, or catastrophic failure of the packing object shape.

As in the case of drying, better quality sintered ceramic is achieved by uniform heating and convection in a kiln/oven during firing. Dried packing objects are strong and able to support not only their own weight but the weight of others. Packing objects are randomly piled on the kiln car, fired in a single layer, or individually fired, depending on the sintering process and kiln configuration.

The process for making spoked hollow ceramic shapes is adaptable to standard commercial extruders using normal mass throughput levels. For example, typical throughput rates involve production of one cubic foot of media per minute. For the illustrated hollow spoked spherical ceramic parts, this would mean production of approximately 20 to 25 4.5 inch diameter spheres per minute or a cycle time of about 3 seconds, with smaller spheres having a faster cycle times. Commercial drying and firing processes are in place to handle this throughput rate and require little to no modification to support the hollow shape production.

While the extrusion methods described are particular applicable to the extrusion of moldable ceramic objects for packing media because such materials are corrosion resistant and have high operating temperature, the extrusion methods can be used for extruding metal or plastic materials and can be used for extruding objects for use in applications other than packing media.

Other variations and modifications will be apparent to those skilled in the art. The embodiments of the invention described and illustrated are not intended to be limiting. The principles of the invention contemplate many alternatives having advantages and properties evident in the exemplary embodiments.

What is claimed is:

1. A method of manufacturing objects comprising extruding extrudable material through a plurality of dies, the dies arrayed around an extrusion axis, the dies mounted to permit controlled movement of the dies during the course of extruding the extrudable material to vary the position of extrudate streams exiting the dies relative to the axis.

2. A method as claimed in claim 1, the dies mounted for angular oscillation for manipulating the angle of extrudate streams exiting the dies relative to the axis.

3. A method as claimed in claim 1, the dies mounted for angular oscillation in multiple planes angularly disposed to one another.

4. A method as claimed in any of claim 1, further comprising extruding the extrudable material to obtain objects of cage form defined by a plurality of spokes corresponding to the respective extrudate streams, the spokes fused together at first and second hub regions, the spokes extending between the hub regions and bounding a hollow interior.

5. A method as claimed in any of claim 1, further comprising temporarily supporting the extrudate with a support housing as it emerges from the dies.

6. A method as claimed in claim 5, further comprising relatively moving the support housing and an extrusion head at which the dies are mounted to alter the cage form while the extrudate from the dies is still malleable.

7. A method as claimed in 6, wherein the relative movement is in a direction parallel to the axis of extrusion.

8. A method as claimed in claim 6, wherein the relative movement is movement in a direction about the axis of extrusion.

9. A method as claimed in claim 6, wherein the relative movement is non-uniform.

10. A method as claimed in claim 1, wherein the extrusion is effected vertically.

11. A method as claimed in claim 1, further comprising varying the rate of extrusion through the dies in concert with controlling the movement of the dies.

12. A method as claimed in claim 1, in which the extruded material is a foundational material for forming ceramic.

13. A method as claimed in claim 4, further comprising extruding the extrudable material over an inner mandrel to form a hole at each of the first and second hub regions.

14. A method as claimed in claim 4, further comprising applying a back pressure to force the individual extrudate spokes to fuse together at the hub regions.

15. A method as claimed in claim 4, further comprising scoring the surface of the extrudate streams to encourage fusing at the hub regions.

16. A method as claimed in claim 4, further comprising wetting the surface of the extrudate streams to encourage fusing at the hub regions.

17. A method as claimed in claim 1 further comprising using dies with an aperture shape which is one of round, square, triangular, oval and star.

18. A method as claimed in claim 1, wherein the extruded material is extrudable metal.

19. A method as claimed in claim 1, wherein the extruded material is extrudable plastics.

* * * * *